United States Patent [19]
Miyaoka et al.

[11] Patent Number: 5,398,227
[45] Date of Patent: Mar. 14, 1995

[54] MAGNETOOPTICAL RECORDING REPRODUCING APPARATUS AND METHOD FOR DETERMINING THE POWER OF AN IRRADIATING LIGHT BEAM ON THE BASIS OF A DETECTED AMPLITUDE OF A RECORDING SIGNAL

[75] Inventors: Yasuyuki Miyaoka, Yokohama; Koyo Hasegawa, Tokyo, both of Japan

[73] Assignee: Canon Kabushiki Kaisha, Tokyo, Japan

[21] Appl. No.: 24,394

[22] Filed: Mar. 1, 1993

[51] Int. Cl.⁶ .................................................. G11B 7/125
[52] U.S. Cl. ...................... 369/116; 369/13; 369/54
[58] Field of Search ............ 369/116, 13, 54, 58; 360/59

[56] References Cited

U.S. PATENT DOCUMENTS

| | | | |
|---|---|---|---|
| 5,050,156 | 9/1991 | Barton | 369/116 |
| 5,070,495 | 12/1991 | Bletscher, Jr. et al. | 369/116 |
| 5,185,733 | 2/1993 | Finkelstein et al. | 369/116 |
| 5,216,659 | 6/1993 | Call et al. | 369/116 |
| 5,216,660 | 6/1993 | Iimura | 369/116 |
| 5,233,175 | 8/1993 | Latta | 369/116 |
| 5,233,596 | 8/1993 | Tani | 369/116 |

FOREIGN PATENT DOCUMENTS

| | | |
|---|---|---|
| 0371880 | 6/1990 | European Pat. Off. |
| 0400726 | 12/1990 | European Pat. Off. |
| 0429221 | 5/1991 | European Pat. Off. |
| 0437308 | 7/1991 | European Pat. Off. |
| 0466073 | 1/1992 | European Pat. Off. |

*Primary Examiner*—Paul M. Dzierzynski
*Assistant Examiner*—Kim-Kwok Chu
*Attorney, Agent, or Firm*—Fitzpatrick, Cella, Harper & Scinto

[57] ABSTRACT

A magnetooptical recording/reproducing apparatus is provided with a device for determinating a power of a light beam which is emitted from a light source. In the apparatus, the light beam is irradiated on a magnetooptical recording medium while a magnetic field modulated according to a recording signal is applied to a portion on which the light beam is being irradiated. Light reflected from the medium upon the irradiation of the light beam thereto is detected by a detector, the output from which is used to reproduce the recording signal. The amplitude of the recording signal is detected from the reproduction signal. The power of the light beam to be emitted from the light source is determined on the basis of the detected amplitude of the recording signal.

22 Claims, 13 Drawing Sheets

MAGNETOOPTICAL RECORDING REPRODUCING APPARATUS AND METHOD FOR DETERMINING THE POWER OF AN IRRADIATING LIGHT BEAM ON THE BASIS OF A DETECTED AMPLITUDE OF A RECORDING SIGNAL

BACKGROUND OF THE INVENTION

1. Field of the Invention

The present invention relates to a magnetooptical recording reproducing apparatus, and a method for determining the power of a light beam in the apparatus.

2. Related Background Art

There have been active developments in magnetooptical record/reproducing apparatus as a memory of low cost and large capacity adapted for use in computers, image filing systems or the like. Such magnetooptical record/reproducing apparatus can be roughly classified into so-called light modulation systems and so-called magnetic field modulation systems. In the apparatus of the light modulation system, the magnetization of a magnetic layer of a recording medium is aligned in advance in a given direction, and the magnetic layer is irradiated with a light beam modulated according to information while a magnetic field is applied at the same time in a direction opposite to the above mentioned direction. The magnetic layer is heated, in a portion thereof irradiated with the light beam, close to the Curie temperature of the magnetic layer, and, in the course of cooling thereof, the irradiated portion alone is magnetized in the direction of the applied magnetic field, whereby the information is recorded as an array of pits in which the direction of magnetization is different from that of the remaining area.

On the other hand, in the apparatus of the magnetic field modulation system, a magnetic field modulated according to information is applied to a magnetooptical recording medium, which is scanned with a light beam of a constant power. The magnetic layer of the medium is locally heated, by the scanning with the light beam, close to the Curie temperature thereof. The heated portion, in the course of cooling, is magnetized in the direction of the applied magnetic field. Thus, as in the light modulation system, the information is recorded as an array of pits in which the direction of magnetization is different from that of the remaining area.

The information thus recorded is read by scanning the recording medium with a linearly polarized light beam of a low power (not heating the magnetic layer close to the Curie temperature thereof), and detecting the reflected light of the light beam by a photodetector through an analyzer. The principle of information reading is based on a so-called magnetooptical effect that the polarized state of the reflected light varies depending on the direction of magnetization of the magnetic layer.

As either of the above-mentioned methods utilizes the heating of the recording medium by the light beam, it is very important to determine and control the power of the light beam. For this reason, the conventional magnetooptical record/reproducing apparatus is equipped with a control circuit for controlling the power of a semiconductor laser employed as the light beam source.

FIG. 1 is a schematic block diagram of a laser power control circuit for the semiconductor laser, employed in the conventional magnetooptical information record/reproducing apparatus, wherein shown are a semiconductor laser unit 32 integrally containing a semiconductor laser 32a for emitting a light beam, and a photosensor 32b provided in the vicinity thereof, for detecting the light amount of the laser beam; a current-voltage (I-V) conversion circuit 33 for converting the photocurrent of the photosensor 32b into a voltage signal; a temperature sensor 34 provided in the vicinity of an optical head; and a controller 35 for calculating the laser power from the output of the I-V converter 33, the output of the temperature sensor 34, revolution of the disk obtained as system information, and its radial position, thereby controlling an LD driver 36.

For setting the recording laser power in the above-explained laser power control circuit, at first the semiconductor laser 32a is driven with a predetermined first drive current designated by the controller 35 in a recording laser power range (APC range). In this state the light amount of the semiconductor laser 32a is monitored by the photosensor 32b, and is converted by the I-V converter into a voltage signal. The controller 35 calculates the output laser power, utilizing the predetermined relationship between the laser power output and the monitor output of the photosensor 32b. Then the controller 35 instructs the LD driver 36 to drive the semiconductor laser 32a with a predetermined second drive current, and calculates the output laser power, based on the monitor output of the photosensor 32b and the pre-entered value. The controller 35 determines the correlation between the drive current of the semiconductor laser 32a and the laser power from a thus obtained relationship between the output laser power and two driving currents, and determines the drive current for obtaining a desired laser power from such a correlation, thereby controlling the LD driver 36. The desired laser power means the optimum laser power for the magnetooptical recording medium, in consideration of the revolution of the magnetooptical disk, the linear speed determined by the radial position, and the atmospheric temperature in the apparatus.

More specifically, FIG. 2 shows the relationship, at the information recording on the magnetooptical disk, between the laser power and the carrier-to-noise (C/N) ratio or the carrier-to-noise ($C_2/N_2$) ratio of the secondary harmonic wave. The employed recording conditions are: a magnetooptical disk of 3.5 inches, a revolution of 3000 rpm, a recording frequency of 4.8 MHz, a recording position of 24 mm in the radius of the disk, and recording at room temperature. As shown in FIG. 2, the C/N ratio does not show a large change when the laser power is 4 mW or larger, but the $C_2/N_2$ ratio for the secondary harmonic wave assumes a minimum value at a laser power of about 4.5 mW and becomes larger at a lower or higher laser power. In general, a laser power at which the secondary harmonic wave is minimized is considered to be an optimum recording power according to which recording of information can be effected with least error. It is also known that the optimum laser power is dependent on the temperature of the magnetooptical disk, and is linearly correlated therewith.

For these reasons, the laser power has to be varied according to the temperature of the magnetooptical disk in order to achieve optimum recording, and for this purpose the laser power has to be controlled by detecting the temperature of the disk. It has therefore been customary to provide a temperature sensor in the magnetooptical information record/reproducing apparatus or to directly mount a temperature sensor on the disk cartridge and to control the laser power according to the result of temperature detection.

However, in such prior art, the exact control of the laser power in an optimum manner has been difficult, because the temperature detection is conducted in the interior of the apparatus or on the disk cartridge, instead of the magnetooptical disk itself. In more detail, when the temperature sensor is provided inside the apparatus, it merely detects the temperature of the atmosphere in said apparatus, and the temperature fluctuates by the direction or amount of the air flow within the apparatus, or by the location within the apparatus. For this reason it is not possible to exactly detect the temperature of the magnetooptical disk. Also, since the magnetooptical disk is detached from and mounted in the apparatus, there will result a significant temperature difference between the temperature detected by the temperature .sensor and the actual temperature of the magnetooptical disk, when it is mounted in the apparatus of which internal temperature is already elevated. In such a case, for a certain time after the mounting of the disk, the recording is conducted with a laser power distant from the optimum power, thus leading to recording errors. Also, in a case of detecting the temperature of the disk cartridge, it is still difficult to exactly detect the disk temperature, because there is still a temperature difference between the cartridge surface and the magnetooptical disk due to the differences in the thermal capacity or thermal conductivity between the disk and cartridge. For this reason the exact control of the laser power at the optimum power level has been difficult.

Also, in the conventional magnetooptical record/reproducing apparatus, it has been difficult to exactly set the recording laser power at the optimum value, because of fluctuations in sensitivity among the recording media or because of the limitations in the accuracy of atmospheric temperature measurement due to the precision of the thermistor employed as the temperature sensor. Furthermore, because of the temperature characteristics of the photosensor employed for monitoring the light amount of the semiconductor laser and the loss of laser power on the magnetooptical recording medium due to stains on the lenses in the optical system, the setting accuracy of the output laser power becomes deteriorated in the conventional control device, so that it has been difficult to control the laser power exactly at the desired power level.

SUMMARY OF THE INVENTION

An object of the present invention is to resolve the above-mentioned drawbacks of the prior art and to provide a method for determining the optimum power of the light beam.

Another object of the present invention is to provide a magnetooptical record/reproducing apparatus capable of satisfactory information recording with a light beam of optimum power.

The above-mentioned objects can be attained, according to the present invention, by a magnetooptical recording/reproducing apparatus comprising:
means for irradiating a magnetooptical recording medium with a light beam;
means for applying a magnetic field modulated according to a recording signal to a portion of the medium irradiated by the light beam;
means for detecting the light, reflected by the medium, of the light beam;
means for reproducing the recording signal from the output of the detection means; and
means for determining the power of the light beam, based on the amplitude of the recording signal reproduced by the reproducing means.

Also according to an aspect of the present invention, there is provided a method for determining the power of a light beam in a magnetooptical recording/reproducing apparatus for effecting recording and reproduction of information by irradiating a magnetooptical recording medium with the light beam, comprising steps of:
irradiating the medium with a light beam of a constant power;
applying a magnetic field modulated according to recording signal, to a portion of the medium irradiated by the light beam, simultaneously with the light beam irradiation;
detecting the light, reflected by the medium, of the light beam, simultaneously with the light beam irradiation;
reproducing the recording signal from the detected reflected light; and
determining the power of the light beam, based on the amplitude of the reproduced recording signal.

In another aspect of the present invention, there is provided a method for determining the power of a light beam in a magnetooptical recording/reproducing apparatus for effecting information recording and reproduction by irradiating a magnetooptical recording medium with the light beam, comprising steps of:
irradiating the medium with a light beam of a constant power;
applying, simultaneously with the light beam irradiation, a magnetic field modulated according to a first signal, to a portion of the medium irradiated by the light beam, thereby recording the first signal on the medium;
re-irradiating the recording portion of the first signal in the medium with light beam of a constant power;
applying, simultaneously with the light beam re-irradiation, a magnetic field modulated according to a second signal, to a portion, irradiated by the light beam, of the medium, thereby overwriting the second signal in the recording portion of the first signal on the medium;
detecting, simultaneously with the light beam re-irradiation, the light reflected by the medium, of the light beam;
reproducing the first signal from the detected reflected light; and
determining the power of the light beam, based on the amplitude of the reproduced first signal.

DETAILED DESCRIPTION OF THE PREFERRED EMBODIMENTS

Figure 4:
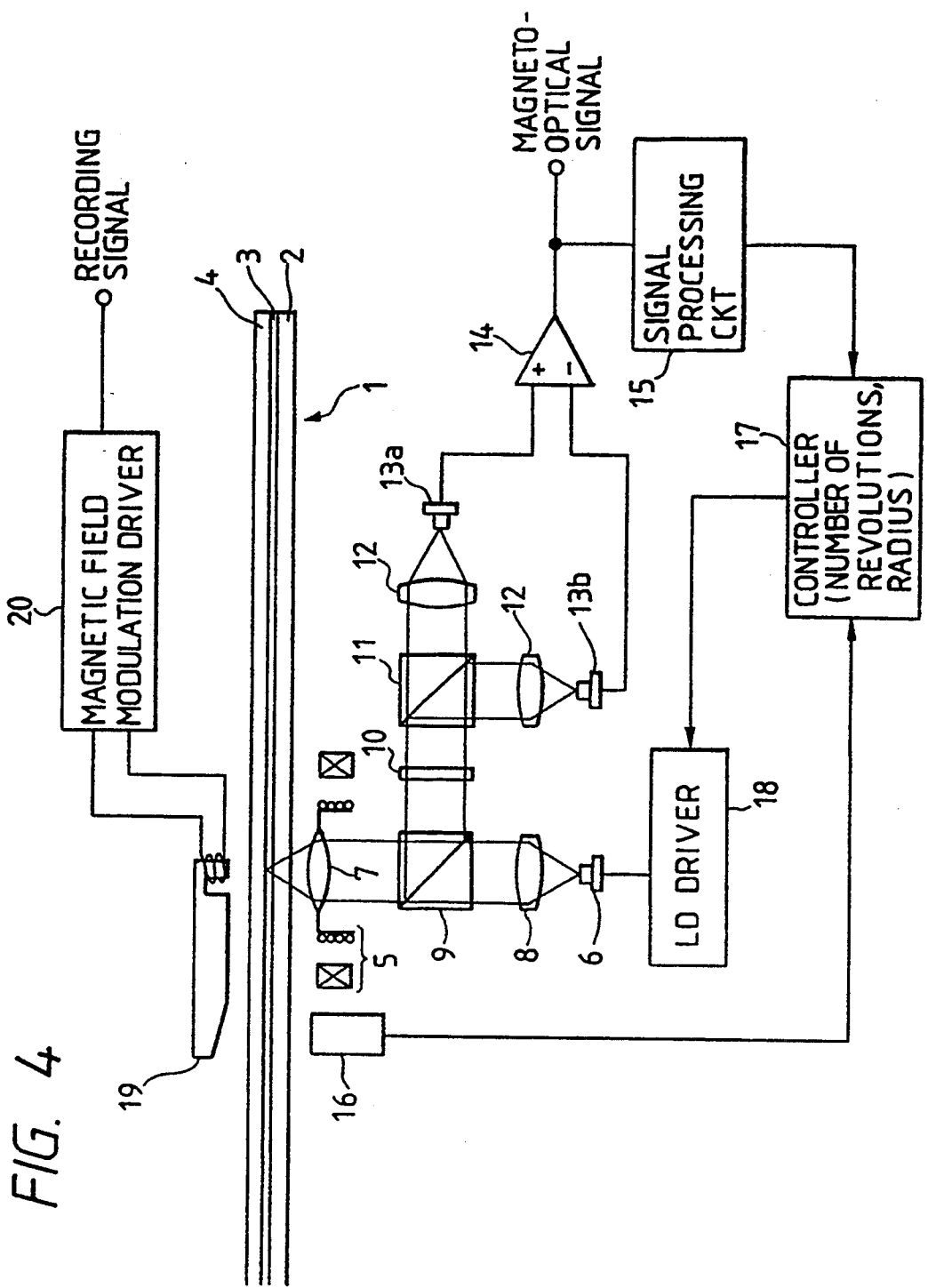
FIG. 4 is a block diagram of a first embodiment of the magnetooptical recording/reproducing apparatus of the present invention.

In the following the present invention will be clarified in detail by preferred embodiments thereof shown in the attached drawings. FIG. 4 is a schematic block diagram of an embodiment of the magnetooptical recording/reproducing apparatus of the present invention, wherein a magnetooptical disk 1 constituting the information recording medium, is rotated at a constant speed by an unrepresented spindle motor. The magnetooptical disk 1 is composed of a transparent substrate 2 of glass or plastics, a magnetic layer 3 and a surfacial protective film 4 provided thereon. The magnetic layer 3 is composed of two magnetic layers, of which structure and properties will be explained later. Components 5–13, namely an actuator 5, a semiconductor laser 6, a condenser lens 7, a beam shaping lens 8, a beam splitter 9, a γ/2 plate 10, a polarizing beam splitter 11 and photosensors 13a, 13b, constitute an optical head for irradiating the magnetooptical disk 1 with a laser beam and obtaining information from the reflected light. The laser beam emitted from the semiconductor laser 6 irradiates the magnetooptical disk 1 through the beam shaping lens 8, beam splitter 9 and condenser lens 7. The condenser lens 7 is moved in the focusing and tracking directions, under the control of the actuator 5, so as to focus the laser beam on the magnetic layer 3. Also, the laser beam is subjected to tracking control so as to move along a guide groove formed on the magnetooptical disk 1.

The laser beam reflected by the magnetooptical disk 1 is deflected by the beam splitter 9 and enters the γ/2 plate 10 and the polarizing beam splitter 11, and is condensed by a lens 12 onto the photosensor 13a or 13b according to the direction of magnetization of the magnetic layer. The outputs of the photosensors 13a, 13b are differentially amplified by a differential amplifier 14 to generate a magnetooptical signal. A signal processing circuit 15, activated at the irradiation with the recording laser power, detects the amplitude of the magnetooptical signal reproduced with the recording laser power. A controller 17 controls an LD driver 18 for driving the semiconductor laser 6, based on the output of a temperature sensor 16, the output of the signal processing circuit 15, and the revolution and recording radius of the magnetooptical disk 1. A floating magnetic head 19 is provided opposed to the condenser lens 7 across the magnetooptical disk 1, in order to apply a modulated magnetic field to the irradiated portion of the magnetooptical disk at the recording operation.

The floating magnetic head generates a magnetic field of varying polarity corresponding to the recording signal, through a magnetic field modulating driver 20. The floating magnetic head moves, in the radial direction of the magnetooptical disk 1, in linkage with the optical head, and, at the recording operation, applies a magnetic field to irradiated portion of the magnetic layer 3, thereby recording information.

Figure 5:
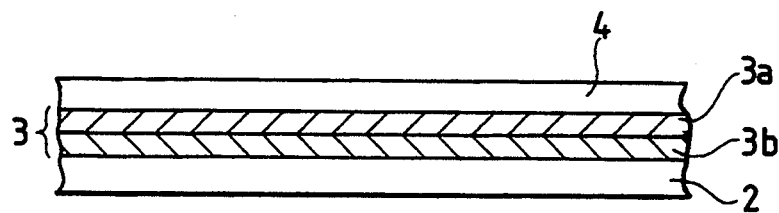
FIG. 5 is a schematic cross-sectional view showing the laser structure of the magnetooptical disk employed in the apparatus shown in FIG. 4.
Figure 6:
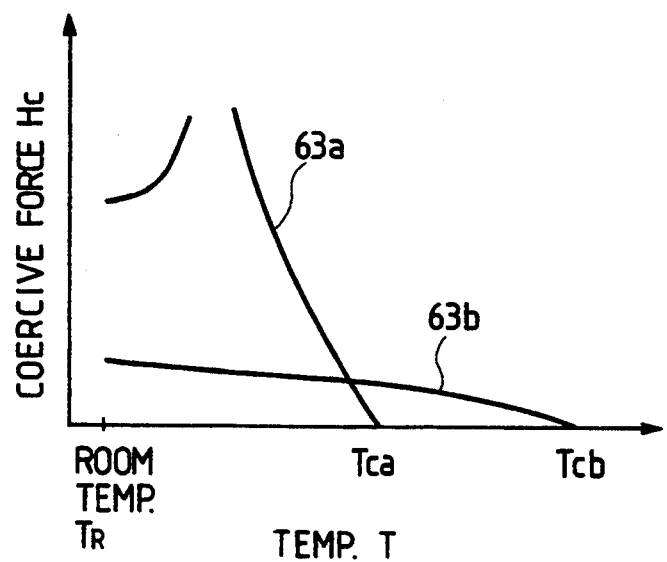
FIG. 6 is a chart showing the magnetic characteristics of a recording layer and a reproducing layer in the disk shown in FIG. 5.

FIG. 5 is a cross-sectional view showing the detailed structure of the magnetooptical disk 1. The magnetic layer 3 has a two-layered structure, consisting of a recording layer 3a and a reproducing layer 3b which is exchange coupled therewith. The characteristics of the recording layer 3a and reproducing layer 3b are respectively represented by curves 63a, 63b in FIG. 6. The recording layer 3a has a higher coercive force at room temperature than that in the reproducing layer 3b, which has a higher Curie temperature than that in the recording layer 3a. Stated differently, the recording layer 3a has a higher coercive force and a lower Curie temperature, while the reproducing layer 3b has a lower coercive force and a higher Curie temperature.

Figure 7:
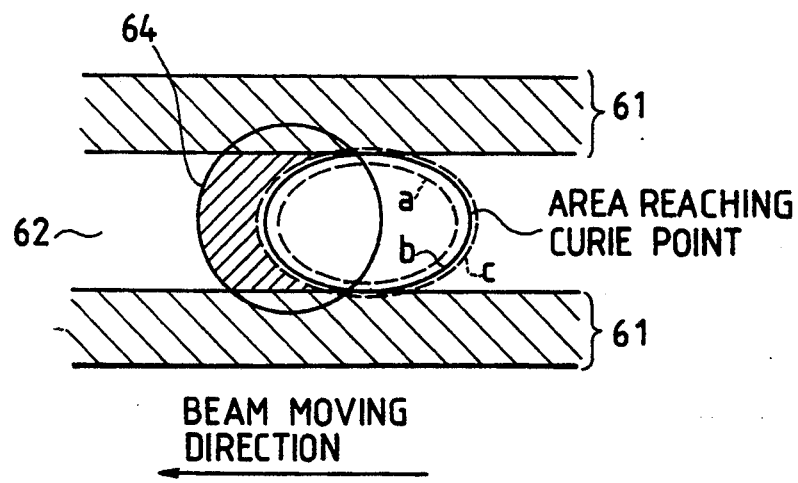
FIG. 7 is a schematic plan view showing the relation between the light beam spot and the temperature in the apparatus shown in FIG. 4.

FIG. 7 shows a laser beam spot on the magnetic layer 3 in the recording operation, and the temperature distribution elevated by the irradiation of the light spot. In FIG. 7, there are shown guide grooves 61 for tracking control, and an information track (land) 62 provided therebetween, for recording information. It is assumed that the laser beam spot proceeds in a direction indicated by an arrow. When the recording laser beam spot 64 irradiates the land as shown in FIG. 7, at first the recording layer 3a of the magnetic layer 3 reaches the Curie temperature. On the other hand, the reproducing layer 3b retains the magnetized state because it does not reach the Curie temperature, but the magnetization is oriented in the direction of the external magnetic field applied by the floating magnetic head 19, because of the low coercive force. In this state; since the magnetic layer 3 requires a certain time for temperature elevation, the area that has reached the Curie temperature in the recording layer 3a becomes positioned behind the laser beam spot. Consequently the laser beam spot contains both an area below the Curie temperature and an area above the Curie temperature, so that the magnetooptical signal reproduced from the reflected light from the beam spot contains the old information before overwriting and the new information currently recorded.

Figure 8:
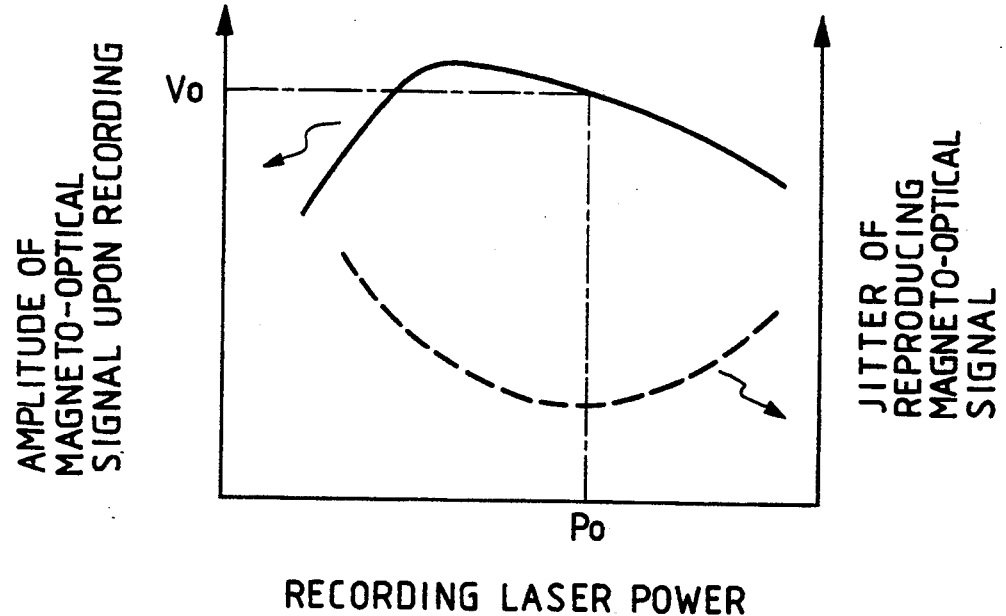
FIG. 8 is a chart showing the relation among the recording laser power, the amplitude of a magnetooptical signal at recording and the jitter of the magnetooptical signal at reproduction.

If the magnetization of the magnetic layer 3 has been caused to orient in one direction prior to the recording operation, the signal detected as the old information consists solely of a DC component, and the new information alone, recorded as the magnetization of the reproducing layer 3b induced by the currently applied external magnetic field, appears as the component of a magnetooptical signal and can be detected as a new recorded signal. Also, when the recording laser power varies, the area reaching the Curie temperature varies as indicated as a, b and c in FIG. 7, and the amplitude of the magnetooptical signal based on the newly recorded signal varies as indicated in FIG. 8, due to changes in the reflected light amount and in the magnetooptical effect, caused by the variation in the recording laser power. Thus the detection of the amplitude of the magnetooptical signal, caused by the newly recorded signal, allows detection of, though indirectly, the dimension of the area reaching the Curie temperature on the magnetic layer 3, and determination of the recording laser power, utilizing this information. In this case, the information obtained from the amplitude of the magnetooptical signal can be directly obtained from the recording media, including all the information on the fluctuation in sensitivity among the magnetooptical recording media, the atmospheric temperature in the apparatus, the loss in the laser power caused by stains on the condenser lens, etc., and the linear speed determined by the revolution and radial position of the magnetooptical disk, so that the setting of the recording laser power is rendered possible, absorbing the influences of all these parameters. Consequently, for example in the relationship between the recording laser power and the jitter observed when the data recorded with said recording laser power are reproduced with the reproducing laser power as shown in FIG. 8, a recording laser power providing the lowest jitter is considered to be the optimum recording laser power $P_0$, and the recording laser power is so controlled that the amplitude of the magnetooptical signal becomes equal to the amplitude $V_0$ of the magnetooptical signal recorded with the optimum recording power $P_0$. In this manner the laser power can be set with improved precision.

In the following there will be explained the function of the present embodiment, based on the above-explained concept. At first the controller 17 in FIG. 4 determines an initial value for the recording laser power setting, based on the atmospheric temperature in the apparatus, measured by the temperature sensor 16, and the linear speed determined by the revolution and radial position of the magnetooptical disk 1, supplied from an unrepresented main control unit. The controller 17 erases a predetermined recording test area of the magnetooptical disk 1, and instructs the LD driver 18 to record a pit train of a predetermined pattern with the thus determined recording laser power. In the magnetic layer 3, the reproducing layer 3b retains a magnetized state as it does not reach the Curie temperature, but, since the coercive force of the reproducing layer 3b is such that the magnetization is sufficiently inverted by the modulated magnetic field, the magnetization is oriented according to the modulated magnetic field, whereby a train of recording pits of a predetermined pattern is recorded on an information track in said recording test area. At the same time, the recording light beam is reflected by the magnetic layer 3 toward the reproducing optical system and is detected by the photosensors 13a, 13b. The detection signals from the photosensors are subjected to differential detection in the differential amplifier 14 to provide a magnetooptical signal, whereby the pits recorded for testing are reproduced simultaneously with the recording. The obtained magnetooptical signal is supplied to the signal processing circuit 15 for detecting the amplitude of the signal. The controller 17 fetches the detected value, then varies the recording laser power stepwise by controlling the LD driver 18, and detects the amplitude of the magnetooptical signal at each laser power. In such a detection of the amplitude of the magnetooptical signal at various recording laser power levels, the controller 17 finds the recording laser power $P_0$ at which the signal amplitude reaches $V_0$, and sets the output power of the semiconductor laser 6 at such power $P_0$ as the optimum laser power. This procedure serves to set the laser power with higher precision. The laser power setting may be executed prior to any information recording, or at a predetermined interval.

Figure 9:
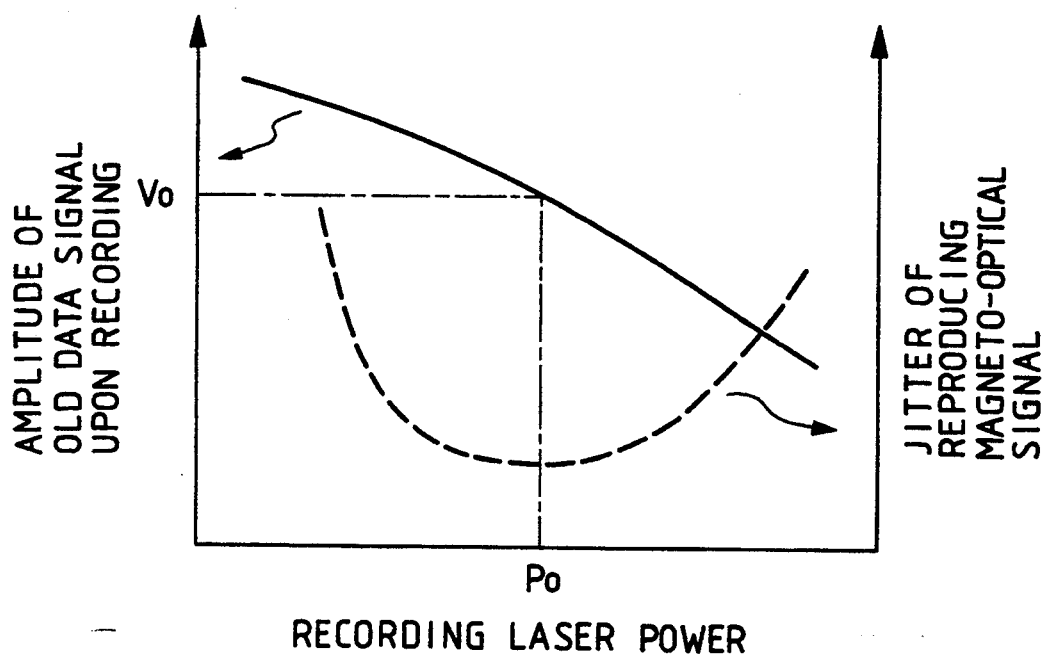
FIG. 9 is a chart showing the relation among the recording laser power, the amplitude of an old data signal at recording and the jitter of the magnetooptical signal at reproduction.

In the following there will be explained a second embodiment of the present invention. In the foregoing embodiment, the laser power setting is executed by the detection of the amplitude of the magnetooptical signal, but, in this embodiment, the old information is read as a crosstalk magnetooptical signal, and the recording laser power is set according to the level of the signal. This embodiment employs an ordinary one-layered magnetooptical disk, instead of the two-layered disk. As shown in FIG. 7, the laser beam spot 64 includes a hatched area which has not reached the Curie temperature and which contains the old recording pit prior to overwriting. It is therefore possible to read the old information, from the reflected light from the laser beam spot 64, as a crosstalk magnetooptical signal. When the recording laser power varies, the size of the area reaching the Curie temperature varies, and, also by the variation in the reflected light amount resulting from the variation in the recording laser power, the amplitude of the crosstalk magnetooptical signal varies as shown in FIG. 9. Consequently, the detection of the amplitude of said crosstalk magnetooptical signal allows detection of, though indirectly, the size of the area reaching the Curie temperature on the magnetic layer 3. As the information obtained from the crosstalk magnetooptical signal includes all the variable factors as explained above, there can be achieved the setting of the recording laser power, absorbing the influences of all these factors. Consequently, for example in the relationship between the recording laser power and the jitter observed when the data recording with the recording laser power are reproduced with the reproducing laser power, a recording laser power providing minimum jitter is considered to be the optimum recording power $P_0$ and the recording laser power can be so controlled that the amplitude of the crosstalk magnetooptical signal reaches $V_0$. In this manner the laser power setting can be achieved with improved precision.

In the present embodiment, as in the preceding embodiment, the controller 17 determines an initial value for the recording laser power setting, based on the atmospheric temperature in the apparatus and the linear speed of the magnetooptical disk 1. Then the controller 17 controls the LD driver 18 thereby recording, in a predetermined recording test area of the magnetooptical disk 1, a train of recording pits of a length at least equal to the hatched area shown in FIG. 7, with the initial laser power. In this recording operation, the test pits are recorded by the application of a modulated magnetic field, simultaneous with the irradiation of a recording light beam. Then the recorded pit train is scanned with the recording laser power, and the obtained crosstalk magnetooptical signal is processed in the signal processing circuit 15 to detect the amplitude of the signal. In this operation, a recording magnetic field of a fixed direction is applied by the floating magnetic head 19 in order to stabilize the direction of magnetization in the vicinity of the area, which has reached the Curie temperature, of the magnetic layer 3, and the crosstalk magnetooptical signal is read, with simultaneous erasure of the test pits. The controller 17 repeats the above-mentioned amplitude detection, with various recording laser power levels through the control of the LD driver 18 as in the foregoing embodiment, and finally sets the output of the semiconductor laser 6 at the optimum recording laser power $P_0$ at which the amplitude of the crosstalk magnetooptical signal reaches $V_0$ shown in FIG. 9. Through the above-explained procedure, the laser power can be set with a high precision as in the embodiment shown in FIG. 4. The laser power setting may be conducted prior to any information recording, or at a regular interval.

Figure 10:
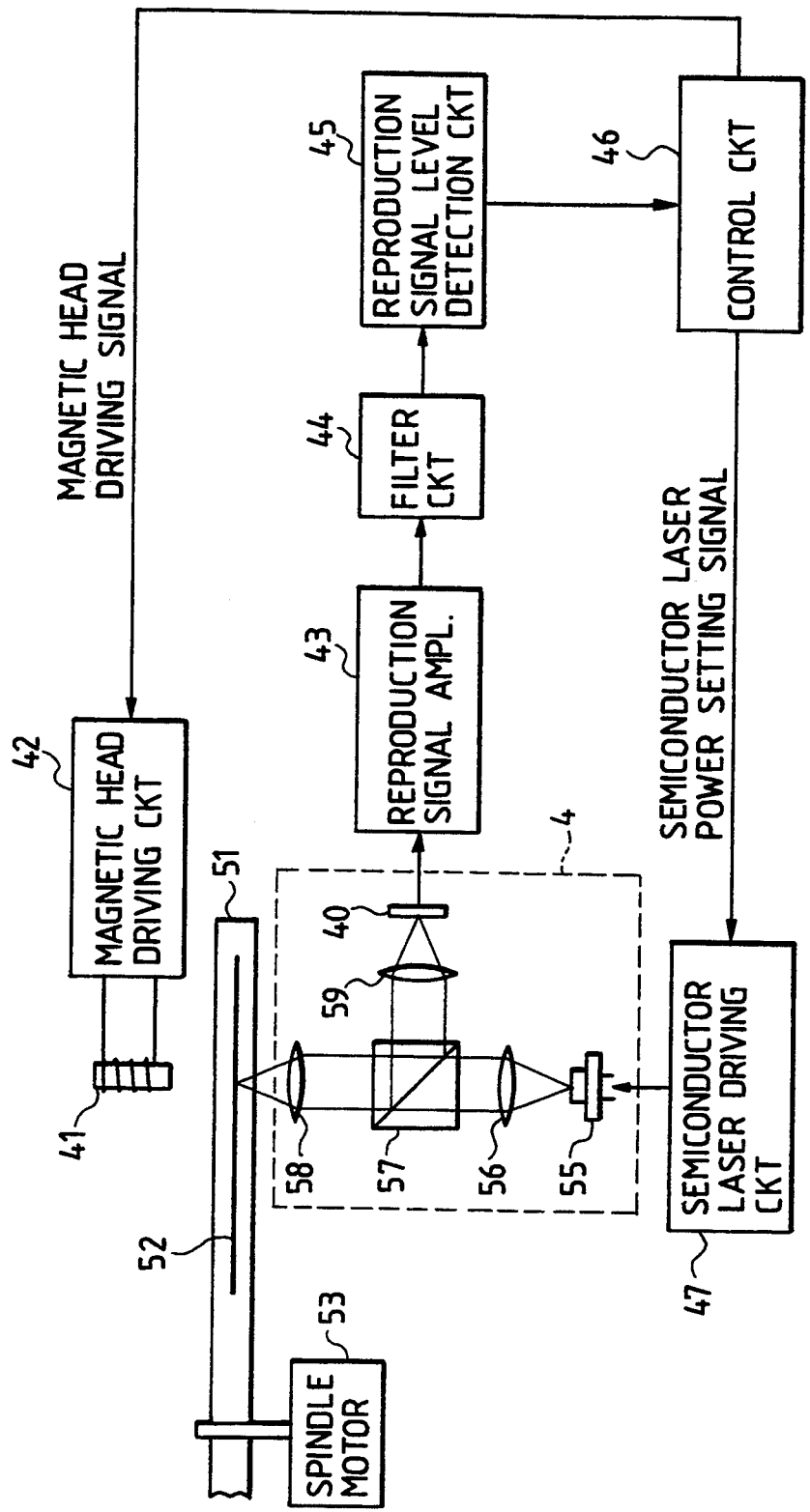
FIG. 10 is a block diagram of a third embodiment of the magnetooptical recording/reproducing apparatus of the present invention.

FIG. 10 is a block diagram of a magnetooptical recording/reproducing apparatus constituting a third embodiment of the present invention, wherein shown is a magnetooptical disk 51 bearing, on a transparent substrate, a thin magnetooptical recording layer 52, constituting a magnetic layer. The magnetooptical disk 51 is supported at the center thereof by a spindle motor 53, and is rotated thereby at a constant speed. Below the magnetooptical disk 51, there is provided an optical head 54 for irradiating the disk with a recording or reproducing light beam and reproducing the information by detecting the reflected light of the reproducing light beam. The optical head is composed, for example, of a semiconductor laser 55 serving as the light source for recording and reproduction; a collimating lens 56 for converting a diverging light from the laser into a parallel light beam; a polarizing beam splitter 57 for separating the incident light beam to the magnetooptical disk 51 from the reflected light beam therefrom; an objective lens 58 for condensing the light beam thereby forming a small light spot on the recording layer 52; a sensor lens 59 for condensing the reflected light from the magnetooptical recording layer 52; and a photosensor 40 for detecting the light condensed by the lens.

Above said magnetooptical disk 51 and in an opposed relationship to the optical head 54, there is provided a magnetic head 41 for generating a recording bias magnetic field. Under the control of a magnetic head driving circuit 42, the magnetic head 41 generates a magnetic field modulated according to the information signal to be recorded, and applies said field to the magnetooptical recording layer 52 of the disk 51. At the information recording, the optical head 54 irradiates the magnetooptical recording layer 52 with a light beam of a constant intensity and a modulated magnetic field is applied by the magnetic head 41 to the beam irradiated portion of the disk, whereby information pits are recorded by the direction of magnetization corresponding to the information signal, on the recording layer 52. A reproduction signal amplifying circuit 43 is provided for photoelectric conversion and amplification of the detection signal from the photosensor 40. At the reproduction of information, the optical head 54 irradiates the magnetooptical recording layer 52 with a reproducing light beam, and the resulting reflected light is detected by the photosensor 40 provided in the optical head 54. The reproduction signal amplifier 43 effects photoelectric conversion and amplification on the detection signal from the photosensor 40, thereby generating the reproduction signal. There are also provided a filter circuit 44 for detecting a predetermined frequency component in the reproduction signal from the reproduction signal amplifier 43; a reproduction signal level detecting circuit 45 for detecting the amplitude level of the reproduction signal released from the filter circuit 44; and a control circuit 46 for detecting the temperature of the magnetooptical disk 51 from the obtained amplitude level and accordingly controlling the power of the semiconductor laser 55 at the optimum recording power.

The temperature of the magnetooptical disk 51 can be detected indirectly by recording signals of different frequencies in a superposed manner in a predetermined area of the magnetooptical disk 51 and detecting the amplitude of the reproduction signal obtained by reproducing the thus recorded signals, as will be explained later in more detail. A semiconductor laser driving circuit 47 is provided for driving the semiconductor laser 55 under the instruction of the control circuit 46. Though not illustrated in FIG. 10, the magnetooptical recording/reproducing apparatus of the present embodiment is provided with an automatic focusing control circuit for focusing the recording or reproducing light spot onto the magnetooptical recording layer 52; an automatic tracking control circuit for causing the light spot to follow the information track; and a seek control circuit for moving the optical head 54 to a desired information track.

Figure 11:
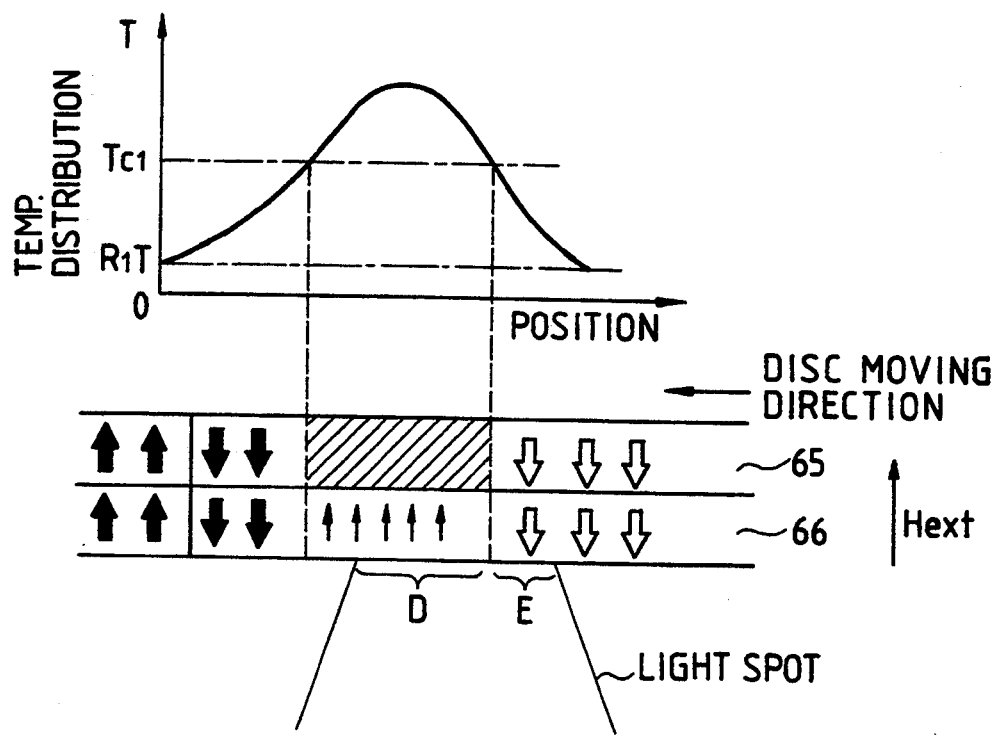
FIG. 11 is a schematic view showing the recording principle in the apparatus shown in FIG. 10.
Figure 12:
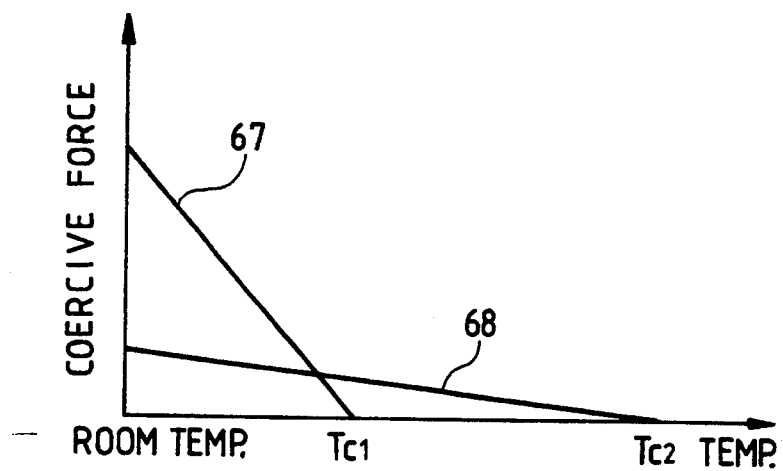
FIG. 12 is a chart showing the magnetic characteristics of a recording layer and a reproducing layer in FIG. 11.

FIG. 11 shows the variation in the magnetization of the magnetooptical recording layer 52 of the magnetooptical disk 51, when the light beam and the magnetic field are applied thereto. The magnetooptical recording layer 52 is composed of two magnetic layers, namely a recording layer 65 and a reproducing layer 66, which are mutually exchange coupled. The recording layer 65 has, as indicated by a line 67 in FIG. 12, a higher coercive force at room temperature, than the coercive force of the reproducing layer 66 as indicated by a line 68 in FIG. 12, and has a Curie temperature $T_{c1}$ lower than that $T_{c2}$ of the reproducing layer 66. When such a magnetooptical recording layer is irradiated with the light spot, the recording layer 65 and the reproducing layer 66 are both heated to assume a temperature distribution shown in FIG. 11. In the recording layer 65, the magnetization of a hatched area the temperature of which exceeds the Curie temperature $T_{c1}$ disappears, and the magnetization of a portion of the reproducing layer 66 facing the portion the magnetization of which disappears orients in the direction of the magnetic field generated by the magnetic head. Since an upward magnetic field is applied in the illustrated case, the magnetization of the above mentioned portion of the reproducing layer 66 orients upwards, as shown in FIG. 11. When the light spot moves away by the rotation of the disk 51, the recording layer 65 is cooled and the magnetization of the reproducing layer 66 is transferred thereto. In this manner the old information on the recording layer is erased, and newly magnetized information pits are simultaneously recorded on the recording layer, corresponding to the information signal. Since the Curie temperature $T_{c2}$ of the reproducing layer 66 is higher than the temperature attained by the irradiation of the recording light beam, the reproduction signal can be obtained from the reflected light even in the application of the recording light beam, in an area D shown in FIG. 11. However, in an area E which is irradiated with the light spot with a temperature of the recording layer 65 lower than the Curie temperature $T_{c1}$, the old information in the recording layer 65 is not erased, so that the old information component can be detected from the area E of the reproducing layer 66 by the exchange coupling.

Figure 13:
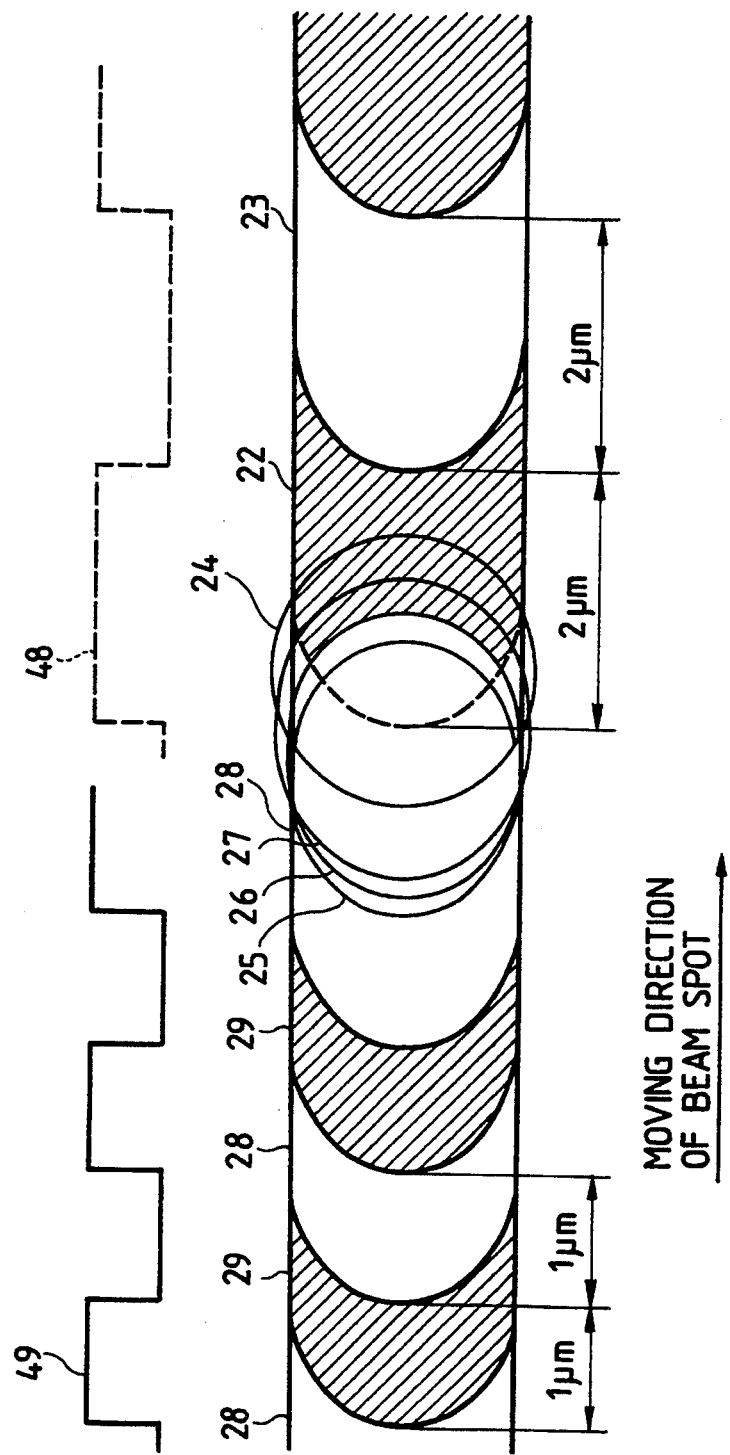
FIG. 13 is a view showing the relation between the pit recorded by the apparatus shown in FIG. 10 and the light beam spot.

In the following the specific functions of the present embodiment will be explained with reference to FIG. 13. When the magnetooptical disk 51 is mounted in the apparatus, the control circuit 46 controls various units to record a signal of a constant frequency on a predetermined recording area of the disk 51. For example, a disk 51 of 3.5 inches is rotated at a revolution of 2400 rpm, and a signal of 1.5 MHz is recorded at a radial position of 24 mm on the disk. In this operation, the control circuit 46 sends a control signal to the semiconductor laser driving circuit 47, thereby setting the power of the semiconductor laser 55 at a predetermined recording power level. The control circuit 46 also sends a driving signal of 1.5 MHz to the magnetic head driving circuit 42, thereby driving the magnetic head 41 at 1.5 MHz. Thus the information track is irradiated with a light beam of a constant intensity, and a modulated magnetic field of 1.5 MHz is simultaneously applied as indicated by 48 in FIG. 13. The information pits 22, 23 shown in FIG. 13 are recorded in this manner. The pit 22 is magnetized upwards because the magnetic field is positive, while the pit 23 is magnetized downwards because the magnetic field is negative. The pits 22, 23 have a length of about 2 μm, because the frequency is 1.5 MHz. The information pit assumes a shape of an arrow feather, because of the magnetic field modulation recording. The above-mentioned recording area is preferably determined to as area beforehand, which is not used for information recording.

After the completion of the above-mentioned recording, the control circuit 46 effects control to overwrite a new signal on the thus recorded information pits. In this embodiment, the overwriting is conducted with a recording frequency of 3 MHz, and without change in the laser power. More specifically, the control circuit 46 sends a drive signal of 3 MHz to the magnetic head driving circuit 42, and also sends a control signal to the semiconductor laser driving circuit 47 so as to drive the semiconductor laser 55 with the same power as in the preceding operation. Consequently the information track is scanned by the light beam spot 24 of a constant intensity, as indicated by an arrow in FIG. 13, and a modulated magnetic field 49 of 3 MHz is simultaneously applied, whereby the overwriting is effected on the old information on the information track. There are thus generated information pits 28, 29 with a length of about 1 μm, corresponding to the recording frequency of 3 MHz. The pits 28, 29 are respectively magnetized downwards and upwards, and the information pits are recorded with a thus alternating direction of magnetization. In FIG. 13, reference numeral 26 indicates an area in which the temperature of the recording layer 20 has exceeded the Curie temperature $T_{c1}$ by the irradiation of the light beam spot 24. It is assumed that the average temperature of the magnetooptical disk 51 prior to the irradiation of the light beam spot 24 is 30° C.

The reflected light of the light beam spot 24 is detected by the photosensor 40 in the optical head 54, and the obtained detection signal is subjected to photoelectric conversion and amplification in the reproduction signal amplifier 43, whereby the recorded information is reproduced simultaneously with the overwriting. In FIG. 13, in the light beam spot 24, of which reflected light is detected by the photosensor 40, since the temperature of the recording layer 65 in the area 26 within the spot. 24 exceeds the Curie temperature $T_{c1}$ as explained before, the old information component of 1.5 MHz previously recorded thereon a is erased to record thereon signal of 3 MHz which is new information. On the other hand, in a crescent-shaped area, other than the area 26, in the light beam spot 24, the old signal component of 1.5 MHz remains since the temperature thereon is below the Curie temperature. Consequently the reproduced signal contains the components of both the old and new information.

Figure 14A:
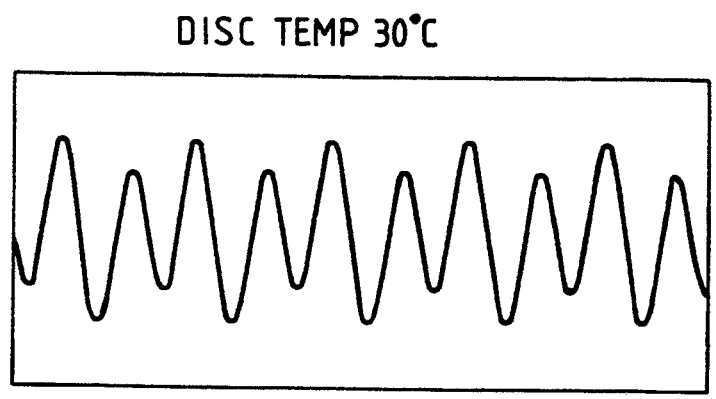
FIGS. 14A to 14C are wave form charts showing various signals at a disk temperature of 30° C. in the apparatus shown in FIG. 10.
Figure 14B:
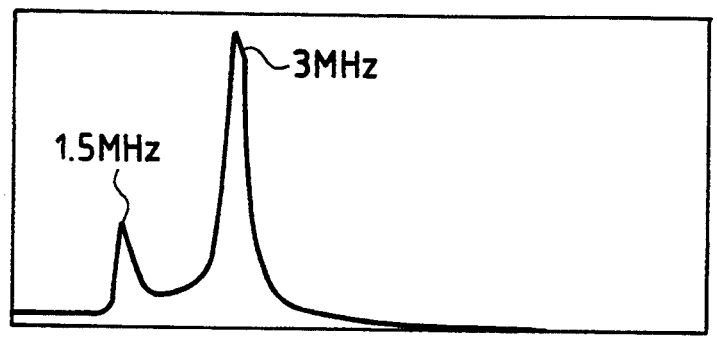
Figure 14C:
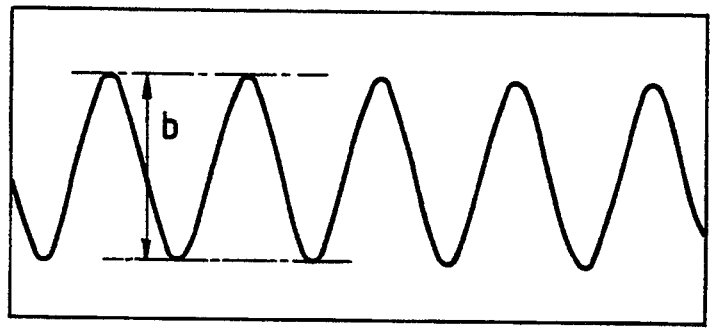
Figure 15:
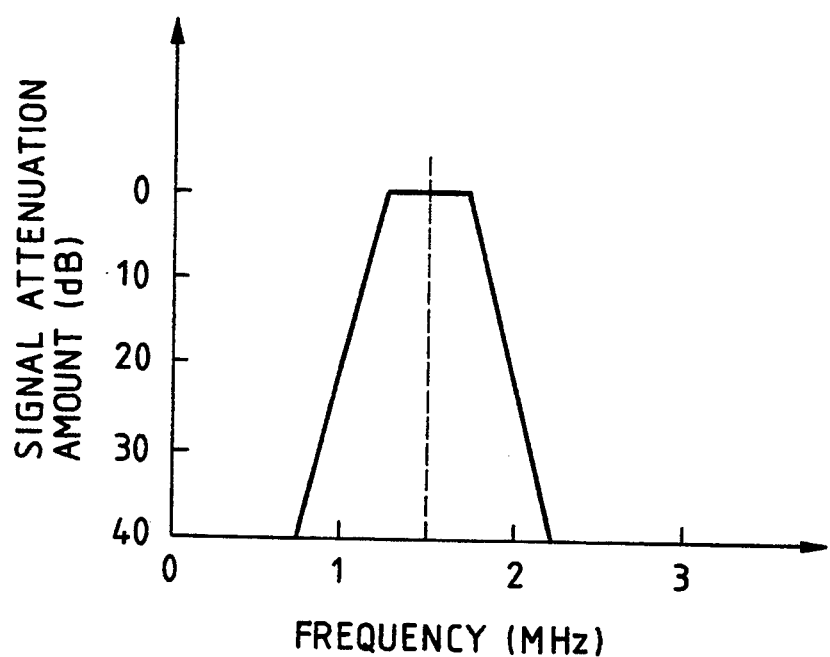
FIG. 15 is a chart showing the frequency characteristics of a filter circuit shown in FIG. 10.

FIG. 14A shows the wave form of a thus obtained reproduced signal, and FIG. 14B shows the frequency distribution of the signal, containing both the old and new information as explained above. The distribution contains the new information component of 3 MHz as indicated by a larger peak, and the old information component of 1.5 MHz, though in a smaller amount, as indicated by a smaller peak. The signal reproduced by the amplifier 43 is supplied to the filter circuit 44 for extraction of the old information component only. As shown in FIG. 15, the filter circuit 44 is composed of a band-pass filter having the center at 1.5 MHz, whereby the new information component of 3 MHz is cut off while the old information component of 1.5 MHz solely is supplied to the next reproduction signal level detecting circuit 45. FIG. 14C shows the wave form of the component of 1.5 MHz extracted by the filter circuit 44. The output signal of the filter circuit 44 is subjected to the detection of the amplitude level in said level detection circuit 45, and the detected amplitude level is supplied to the control circuit 46. In FIG. 14C, the amplitude level is represented by b.

Figure 16A:
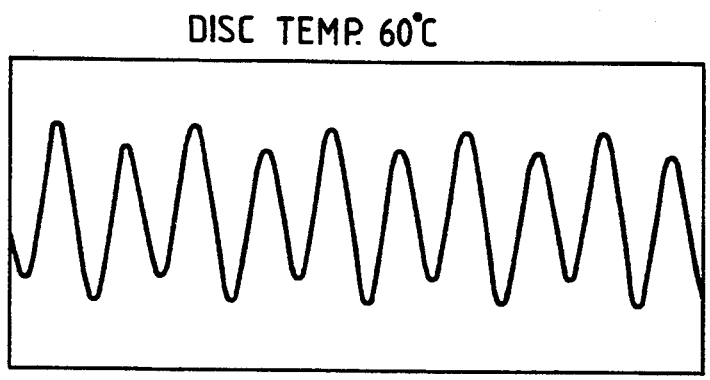
FIGS. 16A to 16C are wave form charts showing various signals at a disk temperature of 60° C. in the apparatus shown in FIG. 10.
Figure 16B:
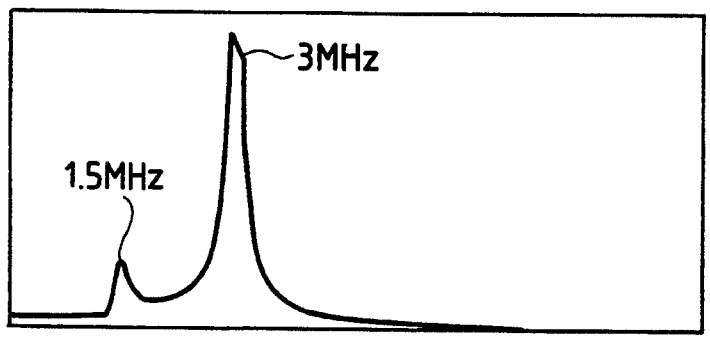
Figure 16C:
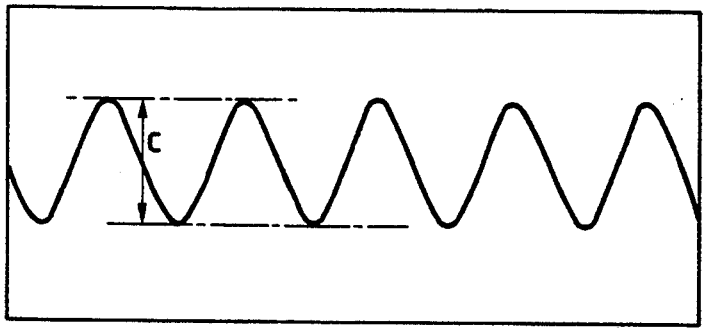

In the following there will be explained the reproduced signal obtained when the average temperature of the magnetooptical disk 51 prior to the irradiation of the light beam spot is 0° or 60° C. At first there will be explained the reproduced signal in a case of 60° C. If the disk temperature becomes higher for the same recording laser power, the temperature of the recording layer 65 becomes higher than in the preceding case of 30° C., and the area exceeding the Curie temperature $T_{c1}$ becomes naturally wider. In FIG. 13, such an area exceeding the Curie temperature at the disk temperature of 60° C. is represented by 27. In such a case, as shown in FIG. 13, the proportion of the area containing the old information decreases within the light beam spot 24, so that the old information component contained in the reproduced signal becomes smaller. FIG. 16A shows the wave form of the reproduction signal at a disk temperature of 60° C., and FIG. 16B shows the frequency distribution thereof. FIG. 16C shows the output signal of the filter circuit 44, in which the amplitude level c becomes smaller, reflecting the narrower area containing the old information within the light beam spot 24. The amplitude level is detected by the detecting circuit 45 and supplied to the control circuit 46.

Figure 17A:
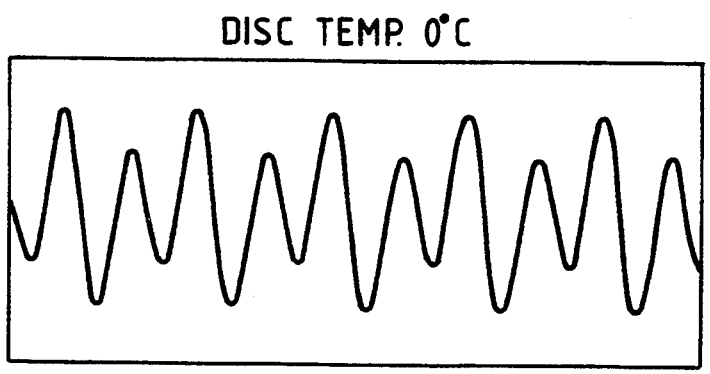
FIGS. 17A to 17C are wave form charts showing various signals at a disk temperature of 0° C. in the apparatus shown in FIG. 10.
Figure 17B:
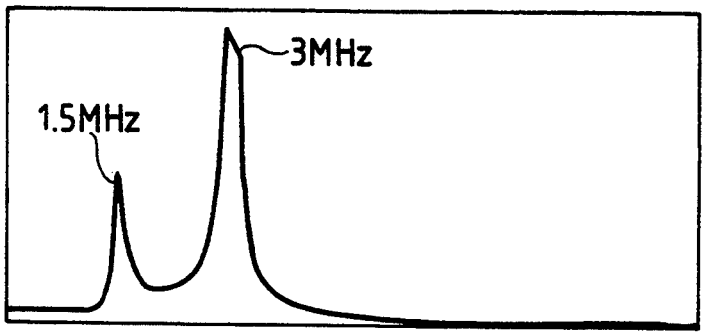
Figure 17C:
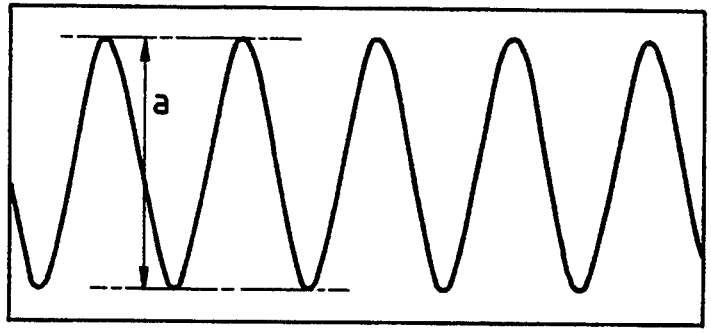

On the other hand, in a case of the disk temperature being 0° C., the area exceeding the Curie temperature $T_{c1}$ in the recording layer 65 becomes smaller, as indicated by 25 in FIG. 13. In this case, the proportion of the area containing the old information increases within the light beam spot 24, so that the old information component increases in the reproduction signal. FIG. 17A shows the reproduction signal, while FIG. 17B shows the frequency distribution thereof, and FIG. 17C shows the output signal of the filter circuit 44. Because of the wider area containing the old information component, the output signal of the filter circuit 44 shows a larger amplitude level a in comparison with the preceding case of the disk temperature of 30° C. The amplitude level is detected by the detection circuit 45 and supplied to the control circuit 46.

Figure 18:
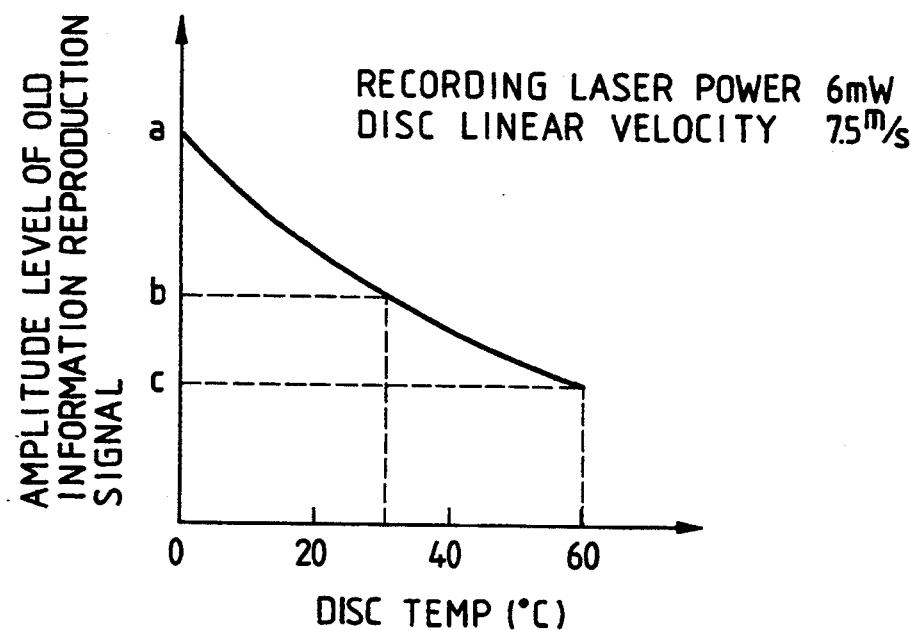
FIG. 18 is a chart showing the relation between the disk temperature and the amplitude of the reproduced signal of the old signal component.

As explained in the foregoing, the amplitude level of the output signal of the filter circuit 44 varies depending on the temperature of the magnetooptical disk 51 becoming smaller as the disk temperature becomes higher as shown in FIG. 18, representing the temperature-dependent variation of the amplitude level in a case of a recording laser power of 6 mW and a linear speed of the magnetooptical disk of 7.5 m/s. In FIG. 18, reference signs a, b and c respectively indicate the output amplitude levels of the filter circuit 44 at disk temperatures of 0°, 30° and 60° C. As explained in the foregoing, the measurement of the amplitude level of the output signal of the filter circuit 44 serves to exactly detect the actual temperature of the magnetooptical disk 51, and the power of the semiconductor laser 55 can be controlled at the optimum recording power, based on the thus detected temperature.

Figure 1:
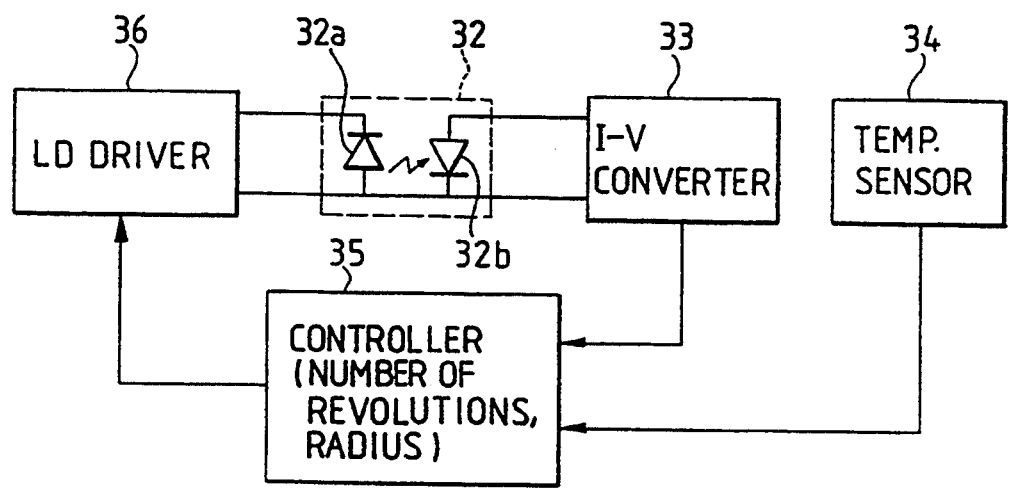
FIG. 1 is a block diagram of a laser power control circuit in a conventional magnetooptical record/reproducing apparatus.
Figure 2:
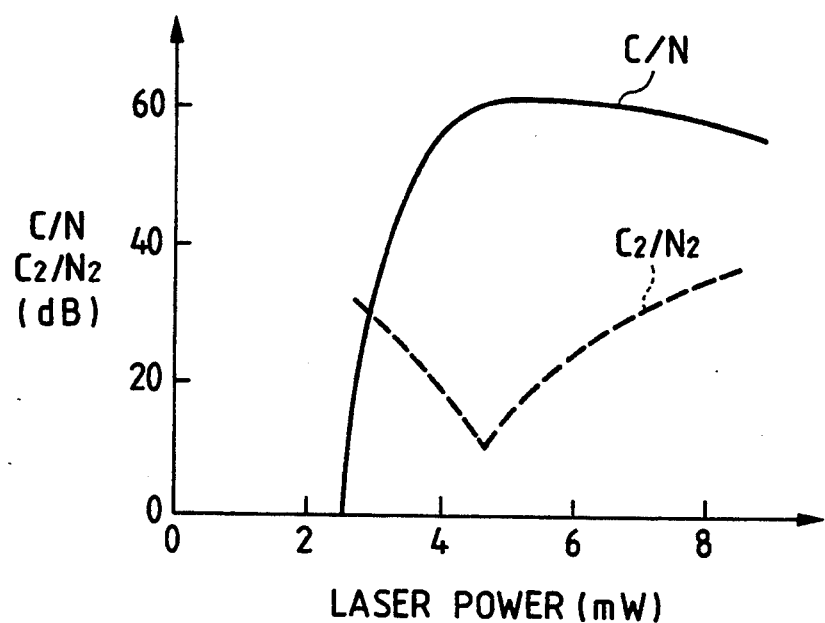
FIG. 2 is a chart showing the relation between the laser power and the carrier-to-noise (C/N) ratio.
Figure 3:
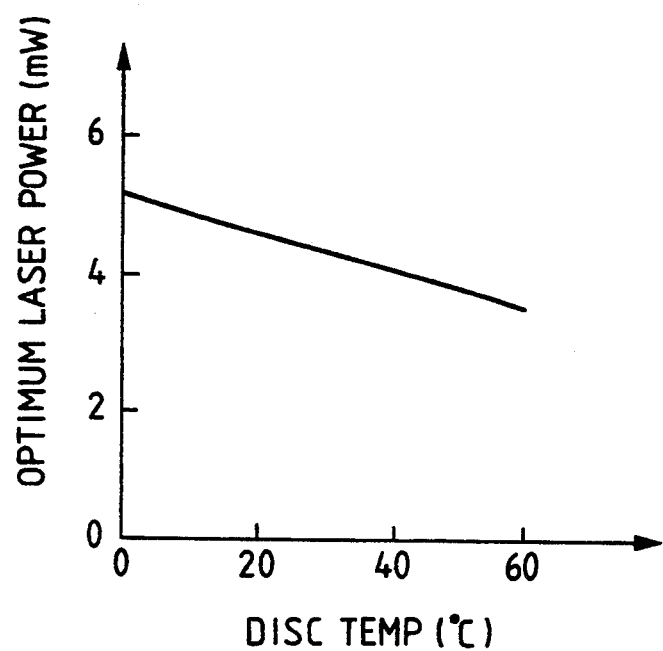
FIG. 3 is a chart showing the relation between the disk temperature and the optimum laser power.

The control circuit 46 is provided therein with a memory, containing a conversion table for converting the amplitude level into the disk temperature, based on the relationship as shown in FIG. 18, and a conversion table for converting the disk temperature into the optimum laser power, based on the relationship as shown in FIG. 3. The control circuit 46, equipped with the two conversion tables, at first converts the amplitude level, obtained by the level detection circuit 45, into the disk temperature by means of the former conversion table, and further converts the disk temperature into the optimum laser power by means of the latter one. Then the control circuit 46 outputs a laser power setting signal to the semiconductor laser driving circuit 47, thereby setting the power of the semiconductor laser 55 at the optimum power level. Through the above-explained procedure, the laser power adjustment is completed after the mounting of the magnetooptical disk 51, whereby the information recording is rendered possible.

As explained above, the present embodiment detects the temperature of the magnetooptical disk, based on the temperature-dependent variation of the area, containing the old information, within the light beam spot, thus providing the exact temperature of the magnetooptical disk in a non-contact manner, without relying on the temperature sensor employed in the prior art. The exact detected temperature serves to set the power of the semiconductor laser exactly at the optimum power level, thereby realizing information recording with a low error rate. The above-explained adjustment of laser power is assumed to be executed at the mounting of the magnetooptical disk, but it is preferably executed from time to time thereafter, for example at a regular interval. The first and seeond recording frequencies are taken as 1.5 and 3 MHz in the foregoing description, but these figures are not critical. Also, there may be adopted the same frequency for the first and second recordings, but, in such a case, the phase has to be shifted between the first and second recordings since otherwise the old information component cannot be reproduced.

In the following there will be explained a fourth embodiment of the magnetooptical record/reproducing apparatus of the magnetic field modulation system, employing an ordinary one-layered magnetooptical disk, instead of a two-layered disk. In this fourth embodiment, at first a predetermined area of the magnetooptical disk is erased and a signal for example of 1.5 MHz is recorded thereon. The erasure is achieved by the irradiation of an erasing light beam, under the application of a magnetic field of a constant direction. Then, the recorded area is subjected to the application of a magnetic field and a light beam for erasure again, and, simultaneously with the erasure, the signal is reproduced from the reflected light of the light beam and the amplitude level of the reproduced signal is detected. A thus obtained amplitude level corresponds to the old information component, as in the foregoing embodiments. Consequently the disk temperature can be detected from the amplitude level, and the laser power can be set at the optimum power level, based on the thus obtained temperature. This embodiment can dispense with the filter circuit, because, in the area in which the temperature of the recording layer exceeds the Curie temperature, the magnetization disappears so that the DC signal component (erasure signal component) does not appear.

In the following there will be explained, as a fifth embodiment, a magnetooptical recording/reproducing apparatus of the light modulation system, employing a magnetooptical disk having two magnetic layers as explained before. In this embodiment, at first a predetermined area of the magnetooptical disk is erased by the application of a light beam and a magnetic field for erasure, and a signal for example of 1.5 MHz is recorded in the thus erased area. The recording is achieved by the light modulation system, by the irradiation of a light beam which is intensity modulated according to the information signal, under the application of a magnetic field of a constant direction. Then the magnetic field and the light beam for erasure are applied again to the thus recorded area, and, simultaneously with the erasure, the signal is reproduced from the reflected light of said light beam and the amplitude level of the thus reproduced signal is detected. The amplitude level corresponds to the old information component, as explained before. Consequently the disk temperature can be detected from the amplitude level, and the optimum laser power setting can be achieved on the basis of the detected temperature. The filter circuit can be dispensed with also in this embodiment.

A sixth embodiment consists of a magnetooptical recording/reproducing apparatus of the light modulation system employing a magnetooptical disk with a magnetic layer. In this embodiment, the erasure, recording and erasure are conducted in the identical manner as in the fourth or fifth embodiment, and the amplitude level is detected by signal reproduction, simultaneously with the erasure. Consequently the disk temperature can be detected from the obtained amplitude level, and the optimum laser power setting can be achieved, based on the thus detected temperature.

Figure 19:
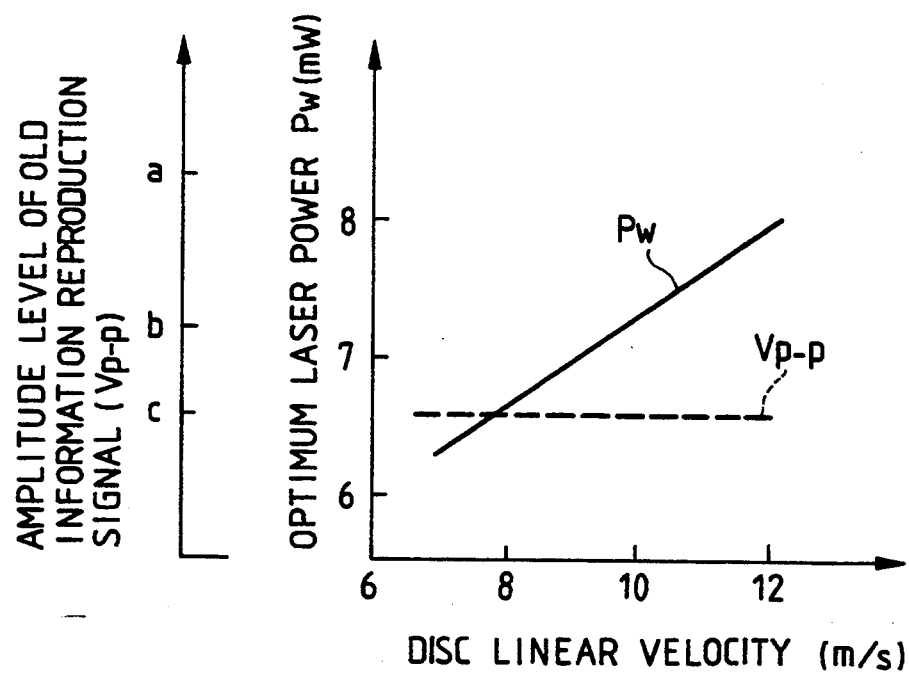
FIG. 19 is a chart showing the relation among the linear speed of the disk, the optimum laser power and the amplitude of the reproduced signal of the old signal component.

In the following there will be explained a seventh embodiment of the present invention. For a constant revolution of the magnetooptical disk, the linear speed of the disk varies depending on the radial position of recording, so that the optimum recording power also varies according to the radial position. FIG. 19 shows the relationship between the disk linear speed and the optimum laser power. The experiment of the present inventors has confirmed that the amplitude level of the reproduced signal of the old information is substantially constant, when the information is recorded with a varying optimum laser power according to the linear speed of the disk as shown in FIG. 19. This fact indicates that, in the optimum recording condition, the proportion of the area containing the old information component is constant in the light beam spot 24 regardless of the linear speed of the disk. As explained before, the optimum laser power is dependent on the disk temperature and the linear speed of the disk. Consequently, in this embodiment, the laser power is so controlled that the amplitude level of the reproduced signal of the old information becomes constant, regardless of the disk temperature and the linear speed of the disk. More specifically, the control circuit 46 shown in FIG. 10 monitors the amplitude level of the reproduced signal of the old information obtained in the level detection circuit 45, and controls the semiconductor laser driving circuit 47 in such a manner that the amplitude level is maintained for example at c shown in FIG. 19 (amplitude at the disk temperature of 30° C.), whereby the power of the semiconductor laser 55 is constantly maintained at the optimum power level and the information recording can be attained with the optimum laser power, regardless of the temperature or linear speed of the disk.

As explained in the foregoing, the present invention provides the advantage of exactly setting the recording power of the light beam at the optimum value, without the influences of the fluctuation in sensitivity among magnetooptical recording media and of the fluctuation in the measurement of the atmospheric temperature, by indirectly detecting the temperature distribution in the portion, irradiated by the light beam, of the magnetooptical recording medium and setting the recording power of the light beam according to the result of the detection.

Also, the present invention enables exact detection of the temperature of the magnetooptical recording medium in a non-contact manner, without employing the temperature sensor. Consequently, there are provided effects of setting the recording laser power exactly at the optimum power level and achieving information recording of a low error rate. Also, in a case of overwriting new information on old information, the recording light beam may be so controlled that the amplitude level of the old information component is maintained at a predetermined level, whereby the recording light beam can be always maintained at the optimum power level, regardless of the temperature and the radial recording position of the recording medium.

The present invention is not limited to the foregoing embodiments but is subject to various applications. For example the form of the magnetooptical recording medium is not limited to disks in the foregoing embodiments, and the present invention is applicable to the apparatus employing recording media of any form, such as a card- or tape-shaped recording medium. The present invention covers any and all applications as mentioned above, as long as it is within the scope and spirit of the appended-claims.

What is claimed is:

1. A magnetooptical recording/reproducing apparatus comprising:
    means for irradiating a magnetooptical recording medium with a light beam;
    means for applying a magnetic field, modulated in accordance with a signal to be recorded, to a portion of the medium, irradiated by the light beam, to record a signal on the medium;
    detecting means for detecting a light beam from the recording medium and for producing a detection output;
    reading means for reading out from the output of said detecting means a magnetooptical signal during a recording operation; and
    determining means for determining the power of the light beam on the basis of an amplitude of the magnetooptical signal read out by said reading means.

2. An apparatus according to claim 1, wherein said determining means comprises means for controlling the power of the light beam such that the amplitude of the magnetooptical signal is within a predetermined range.

3. An apparatus according to claim 1, further comprising a temperature sensor for detecting the temperature in the apparatus and for sending a temperature detection signal to said determining means.

4. An apparatus according to claim 1, further comprising means for filtering the signal sent from said reading means to said determining means.

5. An apparatus according to claim 1, wherein the magnetooptical recording medium includes a first magnetic layer, and a second magnetic layer having a higher coercive force and a lower Curie temperature than those of the first magnetic layer and being exchange coupled with the first magnetic layer.

6. A magnetooptical recording/reproducing apparatus comprising:
    a light source for emitting a light beam;
    an optical system for irradiating a magnetooptical recording medium with the light beam emitted from said light source;
    a magnetic head for recording information signals on the recording medium by applying a magnetic field, modulated in accordance with a signal to be recorded, to a portion of the recording medium, irradiated by the light beam;
    a photodetector for detecting light, reflected by the medium, and for producing an output;
    a signal processing circuit for reading out from the output of said photodetector a magnetooptical signal during a recording operation; and
    a controller for determining the power of the light beam on the basis of an amplitude of the magnetooptical signal read out by said signal processing circuit.

7. An apparatus according to claim 6, wherein said controller controls the power of the light beam such that the amplitude of the magnetooptical signal is within a predetermined range.

8. An apparatus according to claim 6, further comprising a temperature sensor for detecting the temperature in the apparatus and for sending a temperature detection signal to said controller.

9. An apparatus according to claim 6, wherein the magnetooptical recording medium includes a first magnetic layer, and a second magnetic layer having a higher coercive force and a lower Curie temperature than those of the first magnetic layer and being exchange coupled with the first magnetic layer.

10. An apparatus according to claim 6, further comprising a filter circuit for filtering the signal sent from said signal processing circuit to said controller.

11. A method for determining the power of a light beam in a magnetooptical recording/reproducing apparatus for effecting at least one of information recording and reproduction by irradiating a magnetooptical recording medium with a light beam, said method comprising the steps of:

irradiating the medium with a light beam having a constant power;

applying, simultaneously with the irradiation of the medium with the light beam, a magnetic field, modulated in accordance with a signal to be recorded, to a portion of the medium, irradiated with the light beam to record a signal on the medium;

detecting, simultaneously with said irradiation of the light beam, light reflected by the medium;

reading out a magnetooptical signal from the reflected light detected in said detecting step; and determining the power of the light beam so that an amplitude of the read out magnetooptical signal falls within a predetermined range.

12. A method according to claim 11, wherein the recording signal includes a signal for recording pits of a predetermined test pattern on the medium.

13. A method according to claim 11, further comprising a step, prior to said step of irradiating the medium with the light beam, for erasing a signal previously recorded in an area of the medium to be irradiated by the light beam.

14. A method according to claim 11, wherein the magnetooptical recording medium includes a first magnetic layer, and a second magnetic layer having a higher coercive force and a lower Curie temperature than those of the first magnetic layer and being exchange coupled with the first magnetic layer.

15. A method for determining the power of a light beam, in a magnetooptical recording/reproducing apparatus for effecting at least one of information recording and reproduction by irradiating a magnetooptical recording medium with the light beam, said method comprising the steps of:

recording pits having a predetermined pattern on the medium;

irradiating a portion of the medium on which the pits are recorded with a light beam having a constant power;

applying, simultaneously with the irradiation of the medium with the light beam, a magnetic field having a constant direction to a portion of the medium, irradiated with the light beam to record a signal on the medium;

detecting, simultaneously with the irradiation of the medium with the light beam, light reflected by the medium;

reproducing a signal of the pits from the detected reflected light; and determining the power of the light beam, based on an amplitude of the reproduced signal.

16. A method according to claim 15, wherein the pits are recorded in a predetermined area of the medium.

17. A method according to claim 15, wherein the magnetooptical recording medium includes a first magnetic layer, and a second magnetic layer having a higher coercive force and a lower Curie temperature than those of the first magnetic layer and being exchange coupled with the first magnetic layer.

18. A method for determining the power of a light beam, in a magnetooptical recording/reproducing apparatus for effecting at least one of information recording and reproduction by irradiating a magnetooptical recording medium with the light beam, said method comprising the steps of:

irradiating the medium with a light beam having a constant power;

applying, simultaneously with the irradiation of the medium with the light beam, a magnetic field, modulated in accordance with a signal to be recorded, to a portion of the medium, irradiated by the light beam, thereby recording a first signal on the medium;

re-irradiating the portion of the medium on which the first signal is recorded with a light beam having a constant power;

applying, simultaneously with the re-irradiation of the light beam, a magnetic field, modulated in accordance with a second signal to be recorded, to a portion of the medium, irradiated with the light beam, thereby overwriting the second signal on the portion of the medium on which the first signal has been recorded;

detecting, simultaneously with the re-irradiation of the light beam, light reflected by the medium;

reproducing the first signal from the detected reflected light; and determining the power of the light beam, based on an amplitude of the reproduced first signal.

19. A method according to claim 18, wherein said reproducing step comprises filtering the detection signal obtained from the reflected light, thereby extracting a component of the first signal from the detection signal.

20. A method according to claim 18, wherein the second signal has a frequency different from that of the first signal.

21. A method according to claim 18, wherein the second signal is different in phase the first signal.

22. A method according to claim 18, wherein the magnetooptical recording medium includes a first magnetic layer, and a second magnetic layer having a higher coercive force and a lower Curie temperature than those of the first magnetic layer and being exchange coupled with the first magnetic layer.

* * * * *

UNITED STATES PATENT AND TRADEMARK OFFICE
CERTIFICATE OF CORRECTION

PATENT NO. : 5,398,227                    Page  1  of  4
DATED      : March 14, 1995
INVENTOR(S): Yasuyuki MIYAOKA, et al.

It is certified that error appears in the above-indentified patent and that said Letters Patent is hereby corrected as shown below:

ON THE COVER PAGE: item [54], and col. 1, lines 1 & 2,

IN THE TITLE:

"MAGNETOOPTICAL RECORDING" should read --MAGNETOOPTICAL RECORDING/--.

Following "[22] Filed: March 1, 1993, the following should be inserted:
--[30] Foreign Application Priority Data
  March 3, 1992 [JP] Japan 4-80230
  July 16, 1992 [JP] Japan 4-210651--.

IN THE ABSTRACT: item [57],

Line 3, "determinating" should read --determining--.

COLUMN 1:

Line 1, "RECORDING" should read --RECORDING/--;
Line 12, "recording reproducing" should read --recording/reproducing--;
Line 16, "record/reproducing" should read --recording/reproducing--; and
Line 19, "record/reproducing" should read --recording/reproducing--.

UNITED STATES PATENT AND TRADEMARK OFFICE
CERTIFICATE OF CORRECTION

PATENT NO. : 5,398,227
DATED : March 14, 1995
INVENTOR(S) : Yasuyuki MIYAOKA, et al.

It is certified that error appears in the above-indentified patent and that said Letters Patent is hereby corrected as shown below:

COLUMN 2:

Line 67, "record/reproducing" should read --recording/reproducing--.

COLUMN 3:

Line 56, "record/reproducing" should read --recording/reproducing--.

COLUMN 4:

Line 57, "record/repro-" should read --recording/repro- --.

COLUMN 5:

Line 47, "following" should read --following,--.

COLUMN 6:

Line 38, "exchange coupled" should read --exchange-coupled--;
Line 63, "state;" should read --state,--; and
Line 67, "Consequently" should read --Consequently,--.

UNITED STATES PATENT AND TRADEMARK OFFICE
CERTIFICATE OF CORRECTION

PATENT NO. : 5,398,227
DATED : March 14, 1995
INVENTOR(S) : Yasuyuki MIYAOKA, et al.

It is certified that error appears in the above-indentified patent and that said Letters Patent is hereby corrected as shown below:

COLUMN 7:

Line 37, "example" should read --example,--; and
    Line 49, "following" should read --following,--.

COLUMN 8:

Line 25, "following" should read --following,--; and
    Line 53, "example" should read --example,--.

COLUMN 11:

Line 15, "following" should read --following,--; and
    Line 54, "Consequently" should read
--Consequently,--.

COLUMN 12:

Line 12, "spot." should read --spot--;
    Line 19, "Consequently" should read
--Consequently,--; and
    Line 45, "following" should read --following,--.

COLUMN 13:

Line 66, "example" should read --example,--.

UNITED STATES PATENT AND TRADEMARK OFFICE
CERTIFICATE OF CORRECTION

PATENT NO. : 5,398,227
DATED : March 14, 1995
INVENTOR(S) : Yasuyuki MIYAOKA, et al.

It is certified that error appears in the above-indentified patent and that said Letters Patent is hereby corrected as shown below:

COLUMN 14:

Line 6, "following" should read --following,--;
Line 7, "record/reproducing" should read --recording/reproducing--;
Line 23, "Consequently" should read --Consequently,--;
Line 51, "Consequently" should read --Consequently,--;
Line 63, "Consequently" should read --Consequently,--; and
Line 67, "following" should read --following,--.

COLUMN 15:

Line 59, "example" should read --example,--.

COLUMN 18:

Line 51, "phase" should read --phase from--.

Signed and Sealed this

Eleventh Day of July, 1995

Attest:

BRUCE LEHMAN

Attesting Officer    Commissioner of Patents and Trademarks